United States Patent [19]

Domey et al.

[11] 4,334,779
[45] Jun. 15, 1982

[54] NON-CONTACT OPTICAL APPARATUS FOR MEASURING THE LENGTH OR SPEED OF A RELATIVELY MOVING SURFACE

[75] Inventors: Jacques Domey; Marc Rioux, both of Ottawa, Canada

[73] Assignee: Canadian Patents & Dev. Limited, Ottawa, Canada

[21] Appl. No.: 174,574

[22] Filed: Aug. 4, 1980

[51] Int. Cl.³ .............................................. G01B 9/02
[52] U.S. Cl. .................................. 356/358; 356/28.5; 356/429
[58] Field of Search ...................... 356/28.5, 336, 345, 356/358, 429; 250/554, 560, 571

[56] References Cited

U.S. PATENT DOCUMENTS 3,930,734 1/1976 Holly et al. ......................... 356/356

OTHER PUBLICATIONS

Kalb et al. "New Technique in the Processing and Handling of Lower Velocimeter Burst Data," *Rev. Sci. Inst.,* vol. 47, No. 6, pp. 708–711, 6/76.

Abbiss et al. "Laser Doppler Anemometry," *Optics and Laser Technology,* pp. 249–261, 12/74.

Greatel et al., "Signal Analysis for Laser Velocimeter Measurements," *J. of Physics E,* vol. 4, pp. 24–26, 1971.

*Primary Examiner*—John K. Corbin
*Assistant Examiner*—Matthew W. Koren
*Attorney, Agent, or Firm*—Edward Rymek

[57] ABSTRACT

The apparatus generates two optical beams which are directed to a relatively moving solid surface where an interference pattern, having substantially parallel fringes, is formed. The light is scattered and thereby modulated by irregularities on the surface. This modulated light is received and the signal is processed to indicate the length of the surface or its relative speed. The signal processor converts the modulated light signal to a pulse train, and adds pulses to the pulse train when a drop-out in the signal is detected, i.e. when the time between pulses in the pulse train is greater than a factor times the average period of the pulse train. The corrected pulse train is a function of the length of the surface or the relative motion between the apparatus and the surface.

6 Claims, 10 Drawing Figures

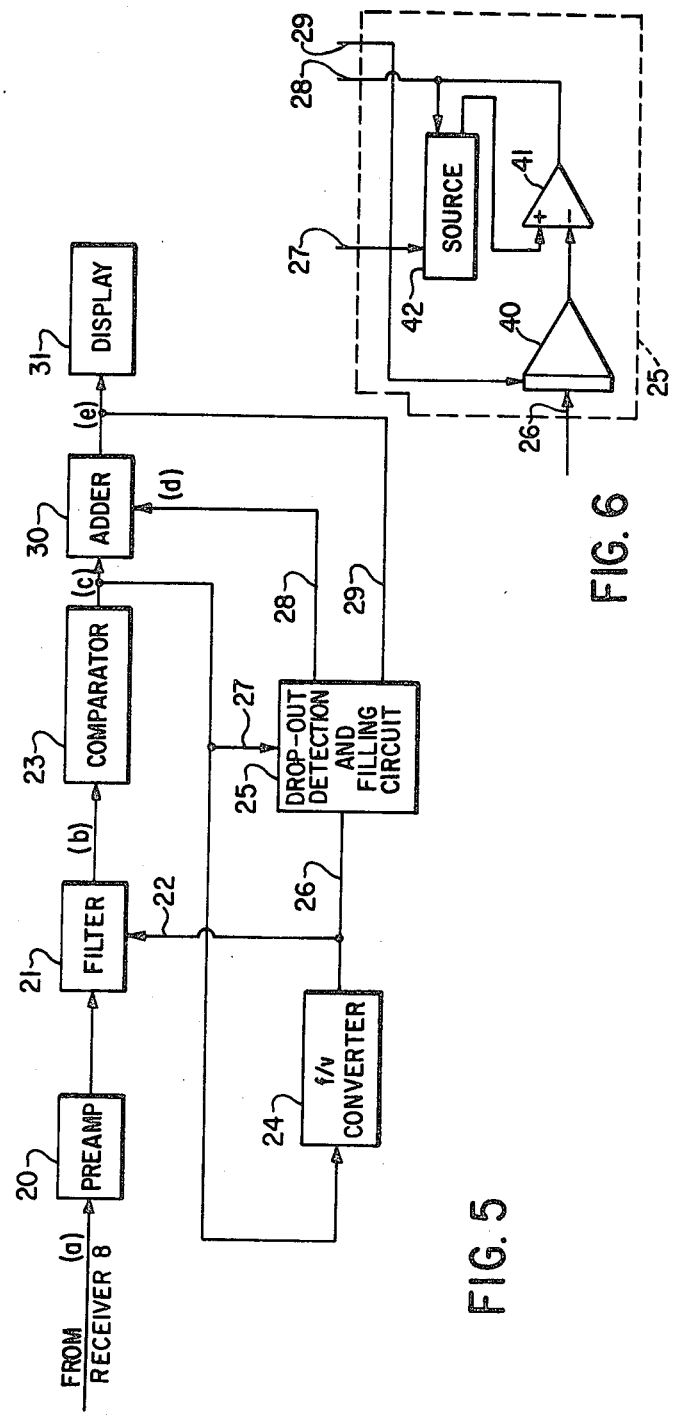

NON-CONTACT OPTICAL APPARATUS FOR MEASURING THE LENGTH OR SPEED OF A RELATIVELY MOVING SURFACE

BACKGROUND OF THE INVENTION

The invention is directed to the length and/or speed measurement of a relatively moving surface and in particular to measurement apparatus in which a signal from an interference pattern on the surface is detected and corrected.

Presently used length and/or speed measuring devices for solid materials are of the contact type wherein a roller or other such device is in contact with the surface. This roller feeds a mechanical or electronic counter which will indicate either the length of the surface which has passed the device or the instantaneous speed of the surface as it moves relative to the device. These devices, though in widespread use, are found wanting in that they may be up to 3% or more in error due to slippage, wear, or other mechanical failure. In addition, they may be unable to operate in some hostile environments, such as with surfaces at high temperatures, or with materials that would be easily damaged by a contacting sensor.

Non-contact speed measurement techniques using the laser Doppler method, have been made to measure the speed of liquid or gas flow. These are known as Laser Doppler Velocimeters (LDV) and are described in the publications by J. B. Abbiss, T. W. Chubb and E. R. Pike, "Laser Doppler Anemometry," Optics and Laser Technology, December 1974, pp 249–261; and by C. Greated and T. S. Durrani, "Signal Analysis for Laser Velocimeter Measurements," Journal of Physcis E: Scientific Instruments, 1971, Vol. 4, pp 24–26. This type of velocimeter suffers a drop-out problem whereby the Doppler signal at times assumes very low amplitudes and cannot be simply detected. Present methods of overcoming the drop-out problem to achieve acceptable precision are generally very expensive.

SUMMARY OF THE INVENTION

It is therefore an object of this invention to provide non-contact apparatus for the measurement of length and/or speed of a relatively moving surface.

It is a further object of this invention to provide non-contact optical measurement apparatus capable of providing precise length and/or speed measurements.

These and other objects are achieved in a non-contact measurement apparatus for measuring the length or speed of a solid surface in relative motion with the apparatus, which includes an optical device for producing an optical interference pattern on the surface, an optical receiver for receiving modulated light reflected from the surface, and a signal processing circuit coupled to the receiver for processing the signal to indicate the length of the surface or the speed of the relative motion between the surface and the apparatus. The signal processing circuit includes a converter for converting the modulated light signal to a pulse train, a detector for detecting a break in the sequence of pulses in the pulse train, a correcting circuit for adding pulses to the pulse train during the break in the pulse sequence, and an indicator for indicating the length or speed as a function of the corrected pulse train. The indicator may include a counter for counting the total pulses in the corrected pulse train to indicate the surface length.

In accordance with another aspect of the invention, the detector in the processing circuit may determine the approximate period T of the pulse train and the correction circuit may add pulses having substantially the same periodicity as that of the pulse train.

In accordance with a further aspect of this invention, the pulses may be added during breaks greater than $\alpha T$, where $1 < \alpha < 2$, and starting at a time $\alpha T$ into the break.

Many other objects and aspects of the invention will be clear from the detailed description of the drawings.

BRIEF DESCRIPTION OF THE DRAWINGS

FIG. 5 illustrates the signal processing circuit; and

FIG. 6 illustrates a detailed circuit of one part of the processing circuit.

DETAILED DESCRIPTION

Figure 1:
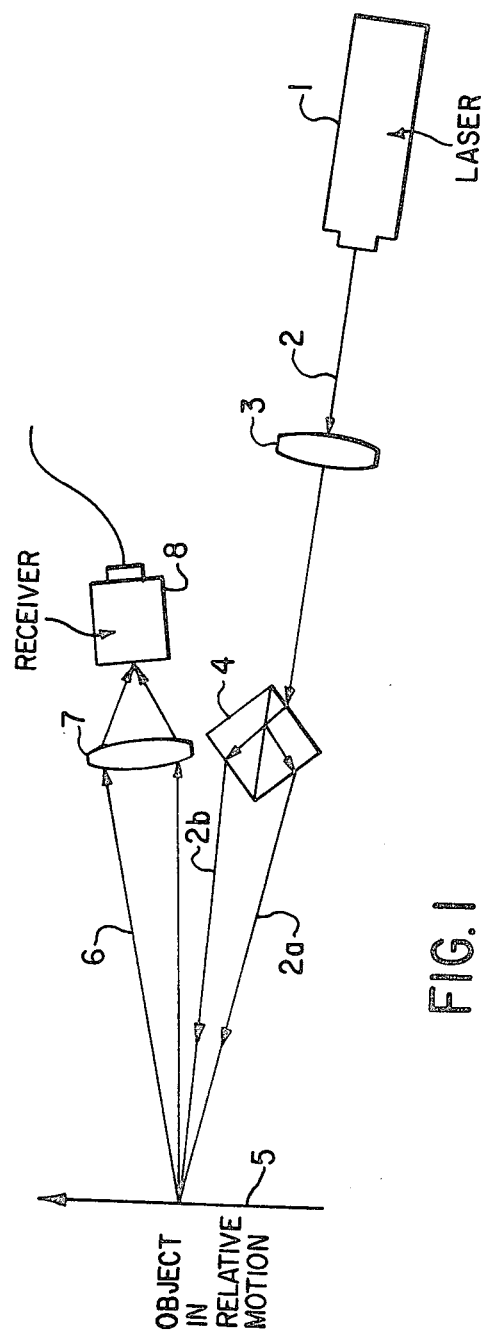
FIG. 1 illustrates the optics for producing interference patterns on the surface and for receiving the reflected modulated light.
Figure 2:
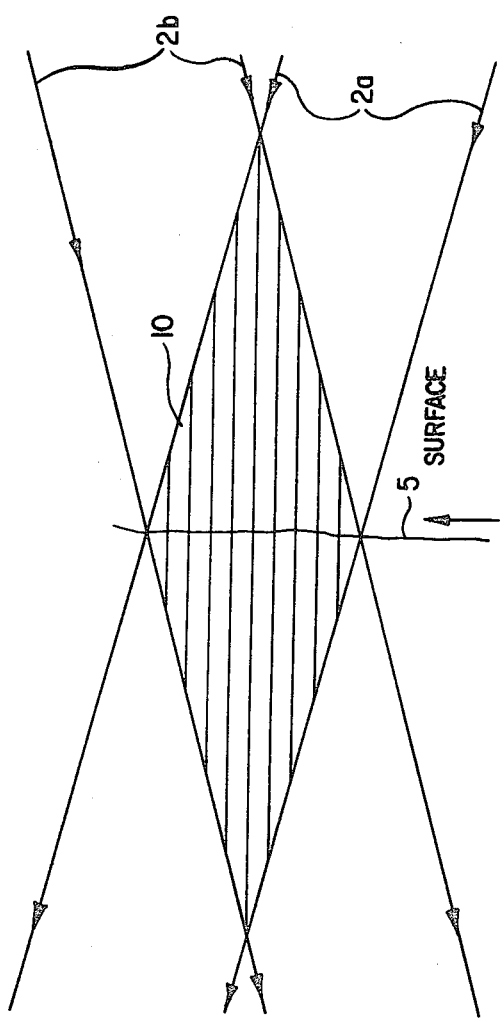
FIG. 2 is a cross-section of the beams producing the interference patterns.
Figure 4A:
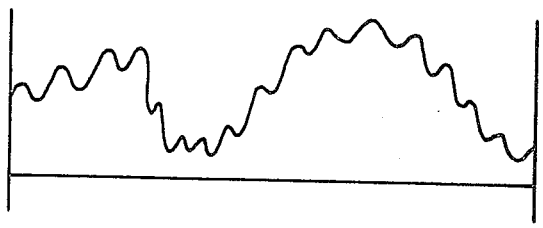
FIG. 4 illustrates the waveform of the signal at various points in the signal processing circuit.
Figure 4B:
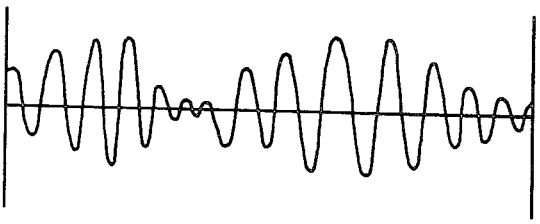
Figure 4C:
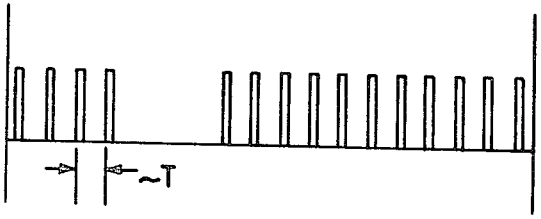
Figure 4D:
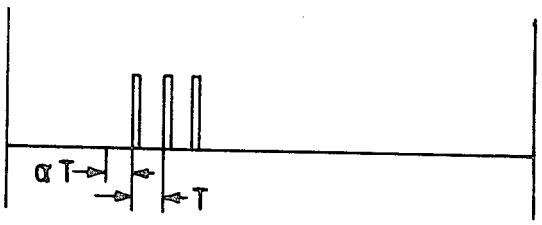
Figure 4E:
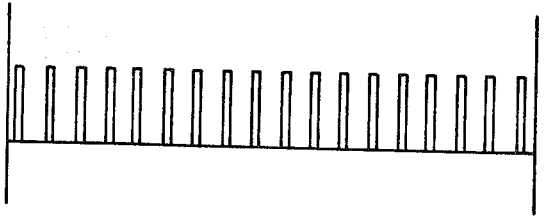

The non-contact measurement apparatus as shown in FIG. 1 includes a light source 1 such as a low power He-Ne laser emitting a red 633 nm beam 2. The beam 2 is focussed by a lens 3 to a cube beam-splitter 4 which splits the beam into two beams 2a and 2b of nearly equal amplitude. These beams 2a and 2b are made to overlap on the surface of the object 5 to be measured. Because the two beams 2a and 2b are mutually coherent and identically polarized, they will interfere constructively and destructively to establish a set of closely spaced interference fringes, in the beam's crossover region 10, consisting of plane parallel regions of maximum and minimum illuminating intensity as shown in FIG. 2 which is a cross-section taken in a plane parallel to the beam axis. These fringes are formed with a fringe spacing of:

$$\Delta x = \lambda / 2 \sin(\theta/2)$$

where $\lambda$ is the laser wavelength and $\theta$ is the angle between the two incident beams which is controlled by translating and rotating the cube 4.

Lens 3 controls the interference pattern dimension (spot size) and the curvature of the beam at that position (plane wave), the latter being required to get an evenly spaced fringe pattern in the volume of the crossover region.

Figure 3:
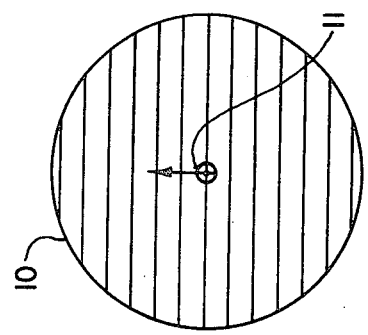
FIG. 3 is a view of the interference pattern on the surface.

The surface 5, which is in relative motion with the measuring apparatus, i.e. either the object or the apparatus may be moved, may be any of various types of flat or circular surfaces, such as bare metal or insulated wires or cables as well as metal, paper, or plastic ribbons, plates or sheets; as long as the surface is not perfect and has minute irregularities. These irregularities form scatterers 11 as shown schematically in the cross-section of the interference region 10 in FIG. 3, which due to the relative motion cross the fringes and reflect a beam 6 of varying amount of light. It is this variation in the amount of light reflected that is collected by a second lens 7 and focussed on a photodetector 8 which converts the modulated light wave into an electrical signal.

When a scatterer 11 is moving through the fringe region 10 it produces a transient due to the finite size of the interference pattern (spot size). In the present case, there is not just one scatterer 11 present at a time in the fringe region 10 but, instead, a large number of scatterers 11 located at random positions on the object surface 5. A continuous signal is obtained which is the random superposition of many transients resulting from the simultaneous passage of many randomly located scatterers 11 at once through the interference pattern. The net amplitude of the wavefront scattered by all the scatterers 11 is proportional to the square root of their number. On the other hand, the noise amplitude is directly proportional to the number. A typical output from the photodetector 8 is shown in FIG. 4 as waveform (a).

The signal processing circuit of the measuring apparatus is shown in FIG. 5. It includes an amplifier 20 for amplifying the signal from the photodetector 8 and a band-pass filter 21 to produce an output as shown in FIG. 4 waveform (b). The filter 21 is preferably an active filter with the low-pass set at $2f_D$ and the high-pass set at $f_D/2$ as controlled by input 22, where $f_D$ is the center frequency of the Doppler signal.

This Doppler signal assumes very low amplitudes from time to time. The amplitude modulation observed is a direct result of the random superposition of signal transients of the same frequency but having a random phase relationship, such that a null occurs from time to time when the amplitudes of the signals from the scatterers cancel. The center frequency ($f_D$) of the frequency spectrum of the Doppler signal is the reciprocal of the transit time of a scatterer through one fringe. The frequency broadening is related to the fringe pattern diameter (spot size) and is in fact inversely proportional to the transit time of a scatterer through the entire fringe pattern. In other words, owing to the finite size of the fringe system, only a finite number of cycles are received in the Doppler wave train from each scatterer and this gives rise to the frequency broadening of the signal.

The measurement of the speed of the surface moving relative to the measuring apparatus is based on the frequency $f_D$ and on the fact that every cycle in the Doppler signal represents a surface displacement of $\Delta x$, the interfringe distance. The total length of the material to be measured is the product of the number of cycles (counted during the relative motion) and $\Delta x$.

A comparator 23 compares signal (b) to a threshold value and provides a pulse train (c), as illustrated in FIG. 4. This pulse train has short and frequent drop-outs or breaks in the pulse sequence due to the Doppler signal characteristics. Since the length measurement is determined by the number of cycles, or pulses, these drop-outs or breaks in the pulse train will produce an error in the measurement since the number of pulses counted may constitute 98-99% of the total number of pulses or cycles which would be counted if drop-out did not occur. In order to correct for the drop-out, pulses are added to the pulse train from the comparator 23 during the breaks in the pulse sequence.

To this end, the circuit further includes a frequency to voltage converter 24 connected to the output of the comparator 23. Converter 24 provides a voltage at its output which is directly proportional to an approximate average of the frequency of the comparator signal when it is present. The converter 24 is coupled to the active filter through control line 22 as well as to a drop-out detection and filling circuit 25. Circuit 25 detects drop-out via an input 27 from comparator 23, input 29 from adder 30, and input 26 from converter 24. If a pulse is not received on input 29 over a period determined by the voltage on 26, circuit 25 generates a pulse on output 28 to an adder 30. Adder 30 provides a train of pulses, waveform (e) in FIG. 4, which is the sum of the pulse train received from comparator 23, waveform (c), and from circuit 25, waveform (d). The output of adder 30 is fed back to circuit 25 to reset the circuit 25 to detect the next missing pulse in the pulse train from comparator 23. The output of adder 30 is also coupled to a display circuit 31 which indicated the length and/or relative speed of the surface as a function of the final pulse train. Display 31 may include a counter which counts the pulses in the pulse train to indicate the surface length.

Active band-pass filter 21 may be of the type which includes photoconductors as resistors such that their resistance changes with the intensity of the light incident upon them. The control line 22 would then apply the frequency proportional voltage to an LED which is optically coupled to the photoconductors, thus allowing a change of the cut-off frequencies of the filter 21 by the output voltage from converter 24. The high-pass portion of the filter is a 4-pole, that provides high rejection of low frequency components. The two-pole low-pass portion of the filter lowers the amplitude of the high frequency noise.

This system does not require further circuitry to determine if the filter 21 is set properly nor any circuit to sweep the filter to find the signal frequency. If the signal frequency $f_D$ is much higher than the filter 21 setting, then, because of the non-ideal performance of the filter, the spectrum of the Doppler signal still contains high frequencies; the comparator 23 will trigger on due to the high frequency noise, thus raising the cutoff frequency of the filter which will in turn allow more of the signal at $f_D$ to pass. This process, which takes between 0.1 and 100 ms, will get the converter 24 to output the proper voltage.

One embodiment which the drop-out detector and filling circuit 25 may take is illustrated in FIG. 6. Circuit 25 includes an integrator 40 which integrates the converter 24 voltage received on line 26 and applies the integrated voltage to a comparator 41 which compares the integrated voltage to a reference voltage from source 42. Integrator 40 is reset by the output of adder 30 on line 29. Thus when a pulse occurs in the pulse train from comparator 23, one occurs at the output of adder 30 and the integrator resets to zero. If a pulse does not occur in the comparator 23 pulse train, the integrated voltage increases until it is equal to the source 42 voltage at which time comparator 41 provides an output pulse on line 28 to source 42 to set its voltage and to adder 30, the output of which resets integrator 40. The source 42 voltage is controlled through lines 27 and 28. Source 42 is reset by line 27, when a pulse comes from the comparator 23, at a level such that the integrator 40 period is slightly longer than the Doppler signal $f_D$ period T to detect the first missing pulse. This period is set at $\alpha T$ where $1 < \alpha < 2$ and where $\alpha$ is preferably greater than 1.20. Line 28 sets the source 42 voltage such that the integrator 40 period is approximately equal to the Doppler signal $f_D$ period T. This lets the pulse filling circuit to add pulses having a periodicity substantially equal to the signal $f_D$ period T.

Many modifications in the above described embodiments of the invention can be carried out without departing from the scope thereof, and, therefore the scope of the present invention is intended to be limited only by the appended claims.

We claim:

1. A non-contact optical measurement apparatus for measuring the length or speed of a solid surface in relative motion with the apparatus comprising:
   means for producing an optical interference pattern on the surface;
   means for receiving modulated light reflected from the surface; and
   signal processing means coupled to the receiving means, the signal processing means including converter means for converting the modulated light to a pulse train, detector means for detecting a break in the sequence of pulses in the pulse train, correction means for adding pulses to the pulse train during the break in the pulse sequence, and indicator means for indicating the length of the surface or the speed of the relative motion as a function of the corrected pulse train.

2. An optical measurement apparatus as claimed in claim 1 wherein the detector means includes means for determining the approximate average period T of the pulse train and the correction means adds pulses having substantially the periodicity of the pulse train.

3. An optical measurement apparatus as claimed in claim 2 wherein the detected breaks in the pulse sequence are greater than $\alpha$, where $1 < \alpha < 2$.

4. An optical measurement apparatus as claimed in claim 2 wherein the correction means includes means for triggering the addition of the pulses at a time $\alpha T$ into the break in the pulse sequence, where $1 < \alpha < 2$.

5. An optical measurement apparatus as claimed in claim 2 wherein the correction means includes an active bandpass filter connected to receiver means and controlled by the period determining means to maintain the center frequency at approximately $1/T$, and comparator means connected to the filter means to convert the filter signal to the pulse train.

6. An optical measurement apparatus as claimed in claims 1, 2 or 5 wherein the indicator means includes a counter to count the total pulses in the corrected pulse train to indicate the surface length as a function of the total pulse count.

* * * * *